(12) United States Patent
Gundavelli (10) Patent No.: US 6,795,403 B1
(45) Date of Patent: Sep. 21, 2004

(54) AUTOMATIC DISCOVERY OF SWITCH DEVICES IN A NETWORK

(75) Inventor: Srinath Gundavelli, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/540,717

(22) Filed: Mar. 31, 2000

(51) Int. Cl.$^7$ ............................................. H04L 12/28
(52) U.S. Cl. ..................................... 370/256; 370/390
(58) Field of Search ................................ 370/254, 255, 370/256, 258, 259, 390, 408, 432

(56) References Cited

U.S. PATENT DOCUMENTS

| | | | | |
|---|---|---|---|---|
| 5,446,897 A | * | 8/1995 | Mathias et al. | 709/220 |
| 5,526,489 A | * | 6/1996 | Nilakantan et al. | 709/228 |
| 5,654,985 A | * | 8/1997 | Crayford et al. | 375/211 |
| 5,668,952 A | * | 9/1997 | Slane | 709/245 |
| 5,684,796 A | * | 11/1997 | Abidi et al. | 370/389 |
| 5,734,824 A | * | 3/1998 | Choi | 709/224 |
| 5,742,603 A | * | 4/1998 | Shafir et al. | 370/401 |
| 5,802,319 A | * | 9/1998 | Faulk et al. | 709/249 |
| 5,982,753 A | * | 11/1999 | Pendleton et al. | 370/252 |
| 6,038,600 A | * | 3/2000 | Faulk et al. | 709/224 |
| 6,108,702 A | * | 8/2000 | Wood | 709/224 |
| 6,108,782 A | * | 8/2000 | Fletcher et al. | 713/153 |
| 6,192,034 B1 | * | 2/2001 | Hsieh et al. | 370/241 |
| 6,360,260 B1 | * | 3/2002 | Compliment et al. | 709/224 |
| 6,363,068 B1 | * | 3/2002 | Kinoshita | 370/389 |
| 6,442,144 B1 | * | 8/2002 | Hansen et al. | 370/255 |
| 6,578,086 B1 | * | 6/2003 | Regan et al. | 709/242 |
| 2001/0033548 A1 | * | 10/2001 | Saleh et al. | 370/218 |

FOREIGN PATENT DOCUMENTS

| | | | | |
|---|---|---|---|---|
| EP | 833485 A1 | * | 4/1998 | H04L/29/00 |
| EP | 1091561 A2 | * | 4/2001 | H04N/1/32 |

OTHER PUBLICATIONS

Kim, J.–O. et al. "A Way to Accomodate IP services in ATM Access Networks". IEEE International Conference on ATM, 1998. Colmar, France. Jun. 22–24, 1998. pp. 477–483.*
Ginsburg, D. "ATM Support for the SMDS/CBDS". IEEE Colloquium on Practical Experience with SMDS. London, UK. Oct. 9, 1995. pp. 4/1–4/14.*
IEEE Std 802.1D–1998, Standards for Local and Metropolitan Area Networks; Media Access Control (MAC) Bridges, Jun. 1998 pp. 58–113.*
Taesang Choi et al., "Enterprise Network Management: LAN Status Monitoring", IEEE International Conference on Communications, Seattle, US, Jun. 1995, vol. 3, pp. 1448–1452.*

* cited by examiner

Primary Examiner—Hassan Kizou
Assistant Examiner—Donald Mills
(74) Attorney, Agent, or Firm—Hickman Palermo Truong & Becker LLP (57) ABSTRACT

A method and apparatus provide automatic discovery of switch devices in a switched network. The remote monitor agent of a router is modified to detect packets received at the router that contain multicast destination addresses, e.g., packets that contain Bridge Protocol Data Units (BPDUs). Each packet is examined to determine a transmitting device identifier and a root device identifier value from the packet. The transmitting device identifier value and root device identifier value are associated with one or more switches in a managed network. The remote monitor agent determines the IP addresses that correspond to the transmitting device identifier value and root device identifier value, e.g., using reverse lookup approach. The IP address values, or other identifying information about the discovered switches, are stored in a MIB table. A network management station may retrieve the switch information from the MIB table and thereby discover switch devices in the network for use in a network management topology display or other applications.

74 Claims, 4 Drawing Sheets

AUTOMATIC DISCOVERY OF SWITCH DEVICES IN A NETWORK

FIELD OF THE INVENTION

The present invention generally relates to data processing. The invention relates more specifically to methods and apparatus providing automatic discovery of switch devices in a computer network.

BACKGROUND OF THE INVENTION

Computer networks are widely used in business, education and government to interconnect end stations, such as workstations and personal computers, and to share resources, such as storage devices and servers. Networks may carry data, voice, video, or hybrid messages and information ("traffic"). A network may be organized as a local area network (LAN), a wide area network (WAN), an internetwork that connects one or more LANs or WANs, a campus network, enterprise network, etc. Intermediate network devices such as routers, bridges, switches and gateways are used to route traffic between end stations, between networks, and from one network device to another. Basic information about networks and internetworking is provided in D. Comer, "Computer Networks and Internets" (2d ed. 1999) and "Internetworking Technologies Handbook" (Cisco Systems, Inc., 1999).

Large networks may include thousands of end stations and network devices. In these networks, management of the network devices, their logical interconnections, and their internal configurations becomes a problem. As one response, the network management station (NMS) has been developed. Typically a network management station is a workstation or personal computer that runs a software program known as a network management system. The network management system generally enables an administrator to view a current configuration of a network, re-configure devices or their attributes, monitor network performance, etc.

Network management systems often are used with network devices that communicate using Simple Network Management Protocol (SNMP) and that store configuration information in one or more Management Information Base (MIB) variable values in the network device. The SNMP MIB information stored in a network device enables a NMS to determine the nature of the device more easily. However, not all network devices or switch devices, support SNMP.

For proper operation and to report accurate data, an NMS normally determines the logical and physical configuration of a managed network periodically, e.g., when the NMS initializes or starts operation. One aspect of determining the configuration of a network involves determining what devices are in the network, a process known as "device discovery." Some network management stations can carry out automatic discovery of certain network devices, such as routers and workstations, and thereby provide the ability to manage the discovered devices remotely from the network management system console. An example of a NMS with this capability is a workstation that runs Cisco Resource Manager Essentials, commercially available from Cisco Systems, Inc., San Jose, Calif.

Several approaches may be used to carry out automatic discovery of various network devices. For example, routing table lookup can be used to discover routers, sequential ICMP Echo or Address Resolution Protocol (ARP) table lookup may be used to discover IP hosts, and Service Advertisement Protocol (SAP) table lookup can be used to discover IPX nodes. ARP is described in Request For Comments (RFC) 826, "Address Resolution Protocol."

However, there is no standard approach to discover network switch devices ("switches" or "bridges"). Generally, switches are computer-based systems that connect and permit communication between two or more different network media, e.g., Ethernet, Token Ring, FDDI, etc. An example of a switch is the Catalyst 5000, commercially available from Cisco Systems, Inc. Some NMS products, such as Novell Managewise, cannot discover switches. Other network management systems require the network administrator to provide, manually, seed information pertaining to the switches, e.g., an IP address of the switch. An example of an NMS that requires such seed information is Optivity, from Nortel Networks.

Other systems carry out automatic discovery by sending ICMP Echo requests to all the IP addresses in the IP subnet range, or selectively to some active nodes by looking at the ARP cache on the hosts or on the routers. This approach is roughly equivalent to "pinging" all possible IP addresses in the IP subnet range. If a device responds, and it supports SNMP, then the NMS may also issue a query to the device for the value of any SNMP MIB variables that are specific to switches, such as the "sysType" MIB variable that is defined in MIB-II. For example, the NMS may issue such a query to all the hosts that have responded to the ICMP Echo requests, to determine if any such responding host is a switch.

Unfortunately, such approaches essentially involve blind or brute force searching, and introduce significant ICMP message traffic and SNMP message traffic into the network. For example, there may be hundreds of messages required to identify one switch, e.g., if the subnet range is 255 IP addresses, then 255 packets may be required. Another disadvantage is that the discovery time is too long, on the order of several hours in a complex network. Further, if a switch does not support SNMP, it is not discovered using these approaches because it cannot respond to SNMP requests. And even if a device does support SNMP, different device vendors implement different MIBs, so there is no assurance that a switch can be identified.

Many computer-based network routing devices ("routers") support a form of remote network monitoring that is implemented in a Remote Network Monitoring (RMON) agent in the router. The RMON agent is a software element that is executed by or in the router normally used for traffic analysis or packet capturing. The RMON agent can monitor network traffic on network segments that directly connect interfaces of the routers. The RMON agent can examine all packets that travel across a physical segment that is being monitored. Based on the contents of the packets, the RMON agent can create network traffic statistic values and store them in the form of SNMP RMON MIB values that are used by NMS stations for network traffic analysis. Presently RMON has no applicability to device discovery.

The Spanning Tree Algorithm, as specified in IEEE Specification 802.1D, is implemented in almost all network switches. The Spanning Tree Algorithm defines a protocol that is used for communications between switches for the purpose of eliminating packet looping in a switched network.

Figure 1:
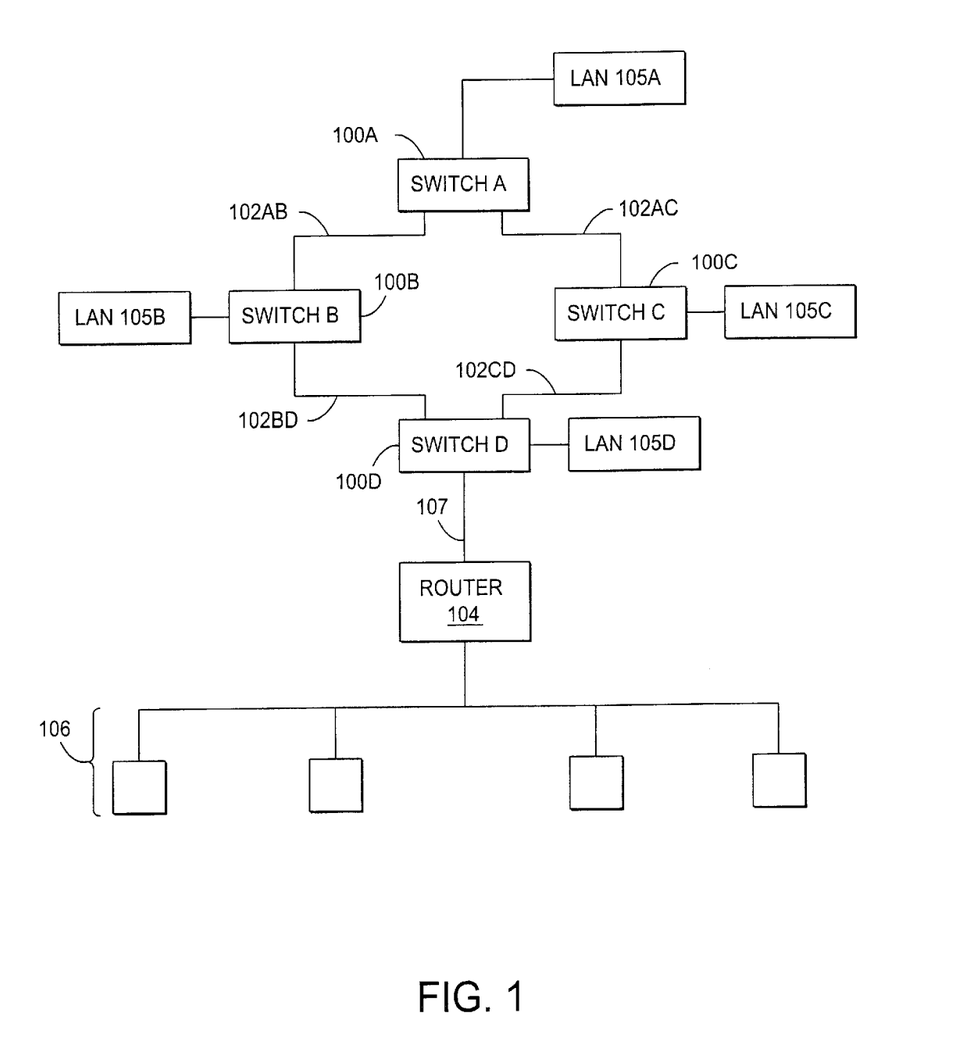
FIG. 1 is a simplified block diagram of a network.

FIG. 1 is a simplified block diagram of a network that illustrates use of Spanning Tree. In FIG. 1, four (4) switches 100A, 100B, 100C, 100D are interconnected by internetwork links 102AB, 102AC, 102BD, 102CD. Switch 100D is further coupled to router 104, which routes data traffic to a local area network (LAN) 106. Each switch 100A, 100B, 100C, 100D is associated with a separate local area network 105A, 105B, 105C, 105D to which the switch directs or bridges traffic from LAN 106.

In this configuration, a logical loop exists among switches 100A, 100B, 100C, 100D, and such a loop can cause a network to crash as packets travel endlessly around the loop. The Spanning Tree algorithm will prevent such crashes by logically severing one of the links 102AB, 102AC, 102BD, 102CD and thereby breaking the loop. Using Spanning Tree, the switches are logically organized in a multiway tree, in which one switch is a root node of the tree, and all other switches are leaf nodes of the tree. In this logical arrangement, loops are eliminated.

Switches operating under Spanning Tree will transmit Bridge Protocol Data Units ("BPDUs") to communicate with other switches. The BPDUs are transmitted periodically, e.g., every thirty (30) seconds. The BPDUs allow each switch to calculate a spanning tree by communicating information about what switches are in the network.

When a switch initializes, it assumes that itself is the root node of a spanning tree, and periodically transmits BPDUs on each of its ports with its unique switch identifier value as a root identifier value and as a transmitting bridge identifier value. Each BPDU includes these data values in a Transmitting Bridge ID field or value and in a Root ID field or value. If a switch receives a BPDU message that contains a Root ID value for a different switch, from a LAN than the LAN that the switch is on, that switch will not send any more BPDUs on that LAN.

When the spanning tree stabilizes, one of the switches is selected as a root and only one switch on each LAN transmits the BPDU on that LAN periodically. For example, referring again to FIG. 1, a spanning tree may comprise switch 100A as root, switch 100B and switch 100C as first level child nodes, and switch 100D as a second level child node.

Based on the foregoing, there is a clear need in this field for an approach for automatically discovering switch devices in a network.

There is a particular need for an approach for automatically discovering switch devices that do not support SNMP.

It would be useful to have an approach for automatically discovering switch devices that takes advantage of a protocol, such as Spanning Tree, that is commonly supported by switches.

SUMMARY OF THE INVENTION

The foregoing needs and objects, and other needs and objects that will become apparent from the following description, are achieved by the present invention, which comprises, in one aspect, a method and apparatus that provide automatic discovery of switch devices in a switched network.

In one aspect, the invention provides a method of automatically discovering switch devices in a network for use by a network management system. One or more data packets are received at a remote monitor agent that is logically coupled to the network, each packet containing a multicast destination address. A transmitting device identifier value and a root device identifier value are determined from information in the packets. One or more switch device addresses, corresponding to the transmitting device identifier value and a root device identifier value, are determined. Information identifying the switch devices is then stored in a storage area that is accessible to the remote monitor agent and the network management system.

In one specific embodiment, the remote monitor agent of a router is modified to detect packets received at the router that contain multicast destination addresses, e.g., packets that contain Bridge Protocol Data Units (BPDUs). Each packet is examined to determine a transmitting device identifier and a root device identifier value from the packet. The transmitting device identifier value and root device identifier value are associated with one or more switches in a managed network. The remote monitor agent determines the IP addresses that correspond to the transmitting device identifier value and root device identifier value, e.g., using reverse lookup approach. The IP address values, or other identifying information about the discovered switches, are stored in a MIB table. A network management station may retrieve the switch information from the MIB table and thereby discover switch devices in the network for use in a network management topology display or other applications.

Aspects of the invention include a router configured to carry out the foregoing steps; a remote monitor (RMON) agent configured to carry out the foregoing steps, alone or in cooperation with a switch discovery service; a computer-readable medium configured to carry out the foregoing steps; and other aspects as set forth in the following description.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and apparatus providing automatic discovery of switch devices in a network is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

An Approach for Automatic Discovery of Switch Devices

In one approach, a router monitors a segment of switches and assists a network management station in carrying out discovery of switches.

Figure 2:
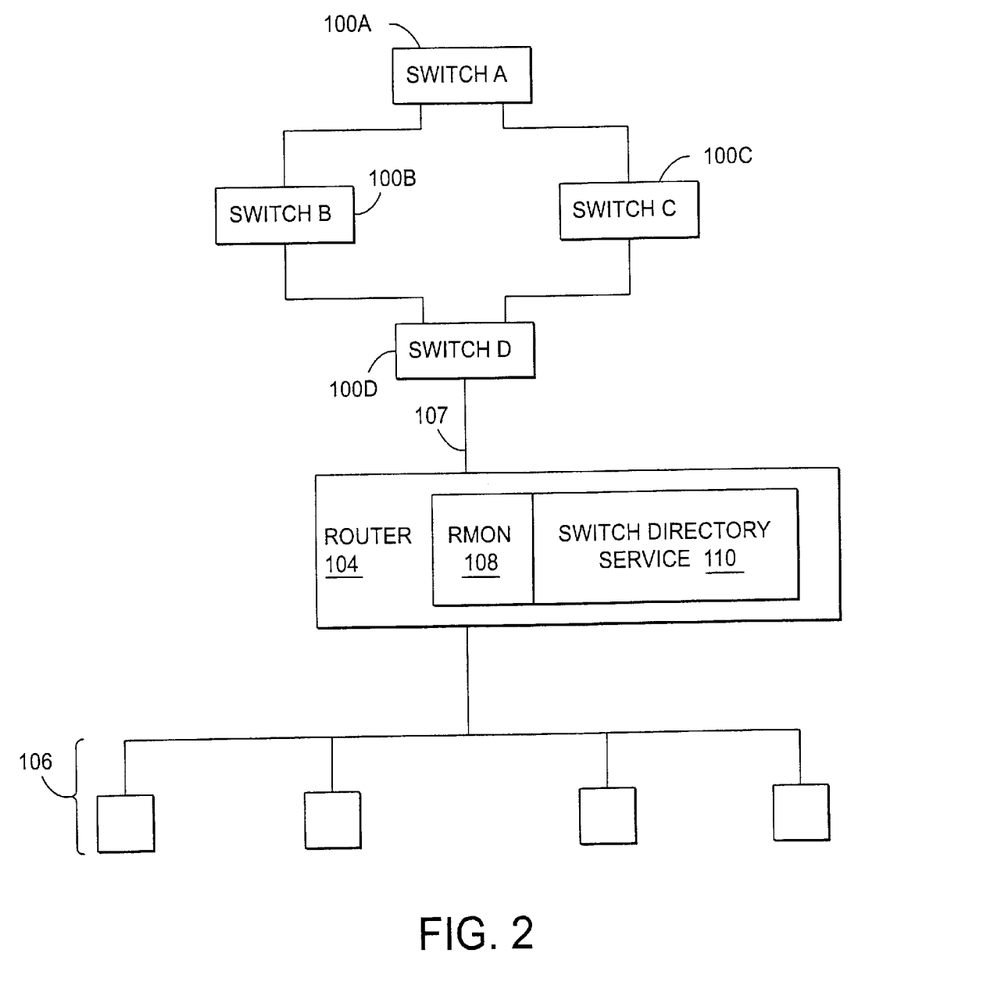
FIG. 2 is a simplified block diagram of a network that includes a remote monitor agent and a switch discovery service.

FIG. 2 is a simplified block diagram of a network that includes a remote monitor agent and a switch discovery service.

As in FIG. 1, FIG. 2 includes a plurality of switches 100A, 100B, 100C, 100D that are logically interconnected. As an example, FIG. 2 depicts four (4) switches 100A, 100B, 100C, 100D, however, a practical system may include any number of switches, other network devices, end stations, etc. Also as in FIG. 1, router 104 is coupled to one of the switches, e.g., switch 100D, via link 107. Router 104 executes a remote monitor (RMON) agent 108, and a switch discovery service 110. The RMON agent 108 and the switch discovery agent 110 are implemented as one or more software elements that are executed by the router 104. RMON agent 108 and switch discovery agent 110 may be implemented as one integrated software element or as separate elements.

Generally, RMON agent 108 monitors bridge protocol data unit (BPDU) traffic from one or more of the switches 100A, 100B, 100C, 100D. Thus, the RMON agent 108 can monitor a single network switch device, or from a cascade of connected switches that form one logical segment. RMON agent 108 cooperates with switch discovery service 110 to identify each BPDU packet and examines its values in order to determine what switches exist in the network.

Figure 3:
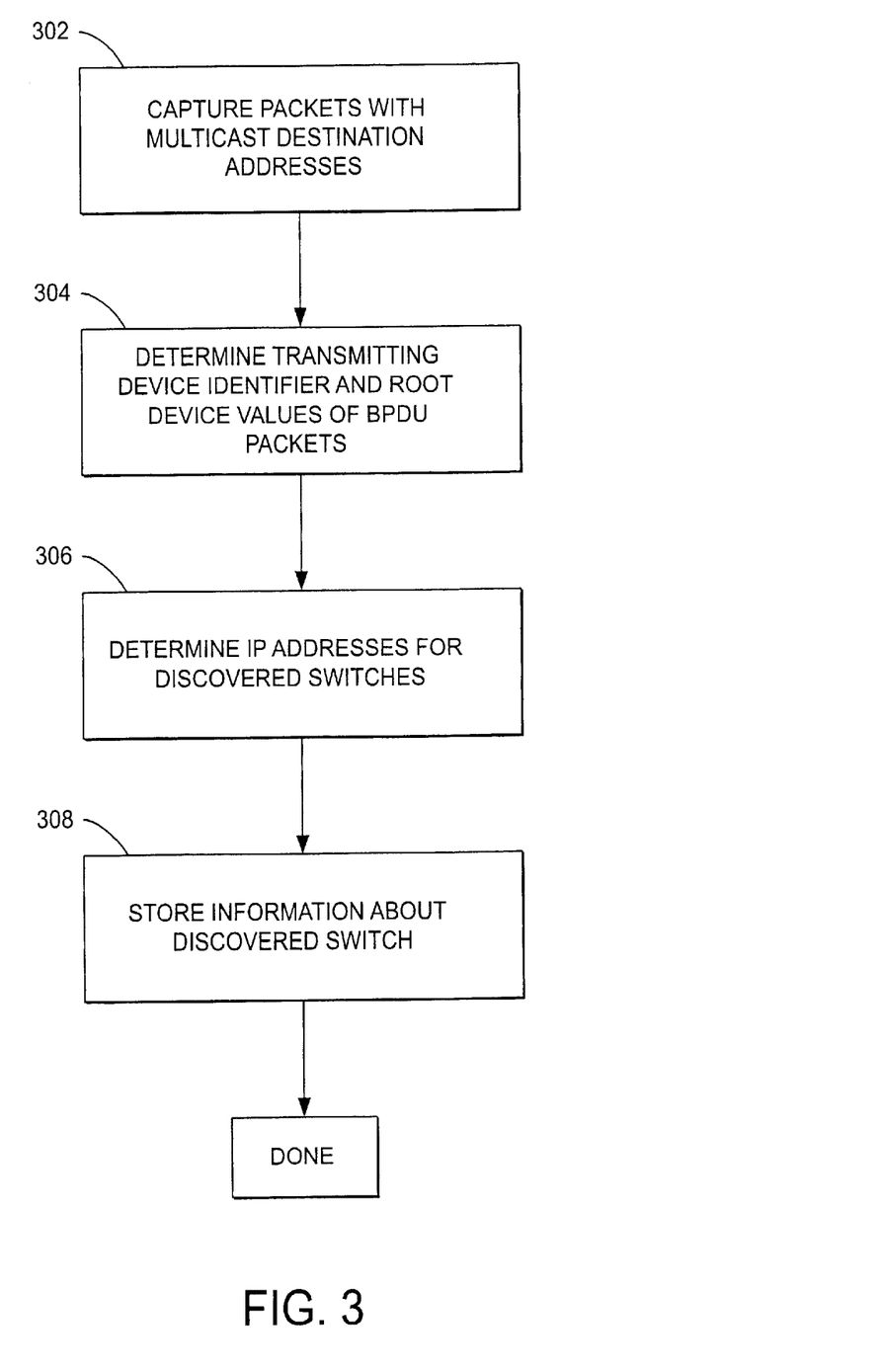
FIG. 3 is a flow diagram of a process of automatic discovery of switch devices in a network.

Each BPDU packet contains a data value for:
Protocol ID
Version
Message Type
Flags
Root ID
Cost of path to root
Transmitting Bridge (switch) ID
Port ID
Message Age
Max Age
Hello Time
Forward Delay FIG. 3 is a flow diagram of a process of automatically discovering switch devices in a network. In one preferred embodiment, the process of FIG. 3 is carried out by switch discovery service 110 of router 104 or, alternatively, by RMON agent 108, or by both the RMON agent and the switch discovery service in cooperation.

In block 302, packets with multicast destination addresses are captured. For example, in a preferred embodiment, RMON agent 108 or switch discovery service 110 on router 104 captures each packet that has a Spanning Tree multicast destination address that appears on any of the router's interfaces, or on the interface on which the switches are being discovered. Such packets may be received via link 107.

In block 304, a transmitting device identifier and a root device identifier are determined based on a BPDU packet that is received in block 302. For example, RMON agent 108 or switch discovery service 110 examines each captured BPDU and determines the value of the Transmitting Bridge ID field in the BPDU, which is normally the MAC Address of the forwarding switch. RMON agent 108 or switch discovery service 110 further determines the Root ID value in the BPDU, which is normally the MAC address of the root switch. In some cases, the Root ID value and Transmitting Bridge ID value may be the same and refer to the same switch device.

In block 306, IP addresses are determined for the switch or switches that are discovered in the preceding step. For example, RMON agent 108 or switch discovery service 110 examines the ARP cache to determine whether it has an entry with an IP address corresponding to each of the discovered MAC addresses. If there is no ARP cache entry for any IP address corresponding to these MAC addresses, then RMON agent 108 or switch discovery service 110 attempts to resolve the IP address corresponding to the MAC address by sending a Reverse Address Resolution Protocol (RARP) broadcast request into the network. The RARP request includes the MAC address value and includes a parameter that requests the corresponding IP address. If a response to the RARP request is received, it contains an IP address value for the switch, which is stored for further use. RARP is described in RFC 903, "Reverse Address Resolution Protocol."

In block 308, information about the discovered switches is stored. For example, in the preferred embodiment, RMON agent 108 or switch discovery service 110 creates and stores an entry in a MIB table. The entry describes the discovered switch by the following information.

Switch MAC Address (obtained from the BPDU)
Switch IP Address (obtained from the RARP response, if any)
Router Interface Number on which the BPDU is captured
Router Interface Address and subnet mask (protocol address)

If the MIB table already contains an entry with this information, then no new entry is created. In a preferred embodiment, RMON agent 108 or switch discovery service 110 stores the foregoing information in an entry in a table that is an extension to the OID RMON MIB tree. The OID RMON MIB tree is a set of data values that is part of a standard MIB. The extension table may define a vendor-specific or vendor-independent switch table.

Referring again to FIG. 2, assume for purposes of illustration that switch 100D is the only switch that is logically coupled to the router, and that switches 100A, 100B, 100C are not present in the network. In this configuration, BPDUs from switch 100D are seen by RMON agent 108 or switch discovery service 110. Further, the Root ID value and Transmitting Bridge ID value in each of the BPDUs will be the same. The value of the Root ID value and Transmitting Bridge ID value will be the Medium Access Control Address (MAC address) of the switch sending that BPDU, i.e., switch 100D. As a result, RMON agent 108 can rapidly discover switch 100D and determine that it is the only switch in the network, by analyzing the Root ID and Transmitting Bridge ID values in each captured BPDU.

Assume now that there are multiple switches connected in a cascade, as shown by the relationship of switches 100A, 100B, 100C, 100D in FIG. 2. Assume further that the switches have resolved a spanning tree in which switch 100A is root. In this configuration, all BPDUs that are received by router 104 will include a Root ID value that identifies switch 100A, and will include a Transmitting Bridge ID value that identifies the switch forwarding the BPDUs to the router 104, i.e., switch 100D. Accordingly, RMON agent 108 or switch discovery service 110 can discover switch 100A and switch 100D in the network based on the values of the Root ID and Transmitting Bridge ID fields in a captured BPDU.

However, switches 100B and 100C, and others in the network are not discovered instantly by RMON agent 108 on router 104. Switches 100B and 100C may be discovered eventually, for example, by an RMON agent on another router connected to the same logical segment through switch 100B and 100C. Alternatively, switches 100B and 100C could be detected as a result of network topology changes. In still another alternative, switches 100B and 100C, may be discovered as a result of the occurrence of BPDU Keep-Alive packet delays. In the BPDU protocol, delays in the transmission of BPDU Keep-Alive packets of greater than a pre-determined period of time will force the switches to re-elect a new switch as root node. Thereafter, BPDUs that identify the new root switch will be received at the RMON agent, which will detect the existence of an additional switch by detecting a new Root ID value.

Any NMS that needs switch information can query the switch table that is created in block 308, using an SNMP MIB request for its values, to retrieve the foregoing values for all switches that have been discovered in the network. The NMS can query each discovered router for these MIB table entries to discover the switches connected to any of the LANs that connect to that router. For example, NMS products, such as Cisco Works, which have the ability to discover routers using standard techniques can query the discovered routers by sending SNMP requests for the switch discovery specific MIB variables to discover switches on the LANs directly connecting the router. The NMS can use the discovered information to generate a graphical display of a network topology that includes switch devices.

The foregoing approach preferably is implemented in the form of one or more computer program instructions or other software elements. In one embodiment, RMON agent. 108 is modified to add instructions that implement the foregoing approach. Alternatively, the instructions are implemented in a separate switch discovery service 110.

Using the foregoing approach, a network management station will produce less network traffic in the network during the process of switch discovery. Further, the described approach is more effective in discovering switch devices than sequential ICMP Echo-based discovery. The described approach is applicable to any switched network in which BPDU elements are communicated and is applicable to any device that generates such elements. Thus, the invention is not limited to detecting switches.

Hardware Overview

Figure 4:
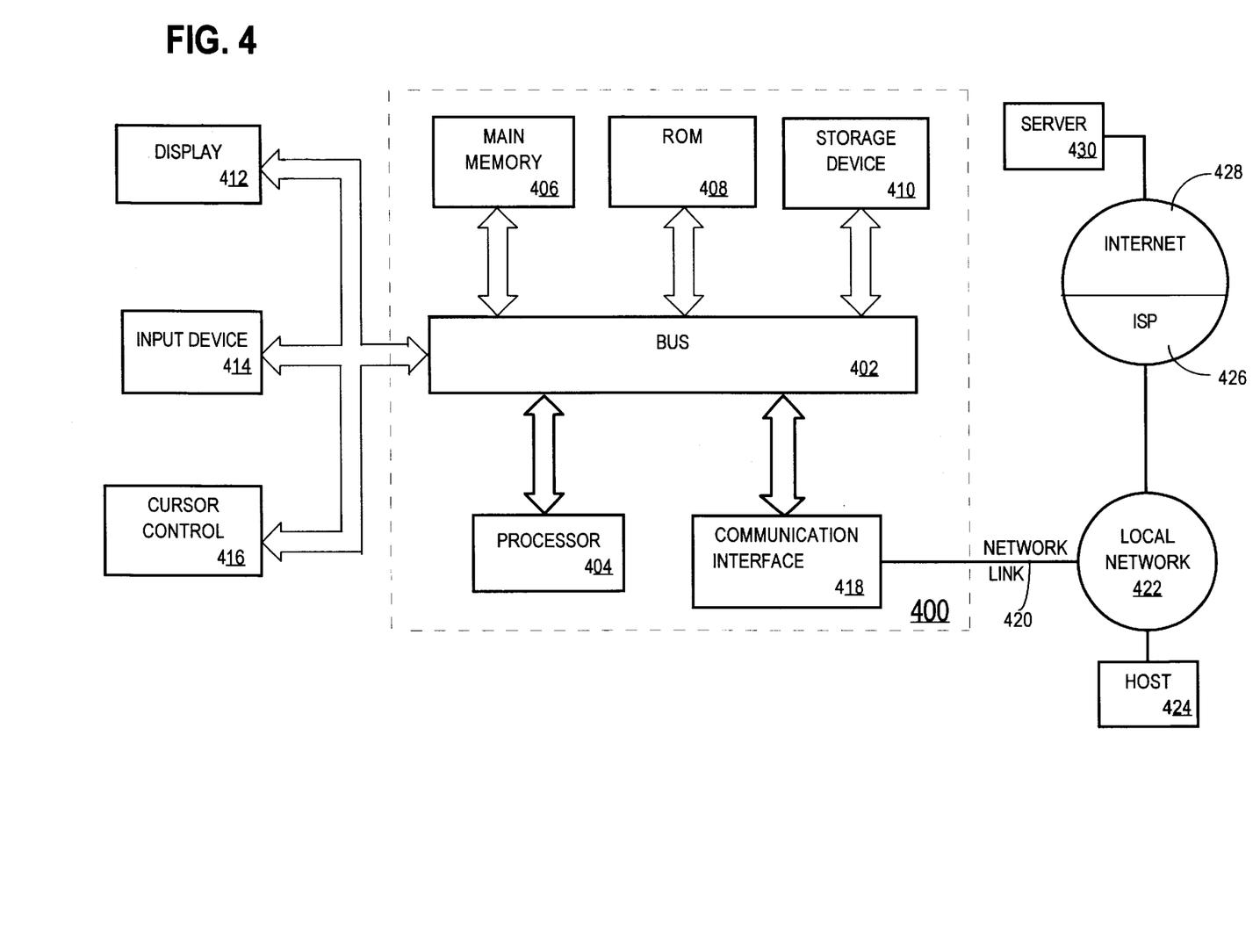
FIG. 4 is a block diagram of a computer system with which an embodiment may be implemented.

FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for providing automatic discovery of switch devices in a network. According to one embodiment of the invention, providing automatic discovery of switch devices in a network is provided by computer system 400 in response to processor 404 executing one or more sequences of one or more instructions contained in main memory 406. Such instructions may be read into main memory 406 from another computer-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418. In accordance with the invention, one such downloaded application provides for providing automatic discovery of switch devices in a network as described herein.

The received code may be executed by processor 404 as it is received, and/or stored in storage device 410, or other non-volatile storage for later execution. In this manner, computer system 400 may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A network comprising:
    a network of one or more local area networks;
    one or more network management systems coupled to the one or more local area networks;
    one or more network management stations carrying at least one of the one or more network management systems;
    at least one network device coupled to one more of the local area networks, the at least one network device carrying instructions for performing the method comprising the steps of receiving one or more data packets at a remote monitor agent that is logically coupled to the network, each packet containing a multicast destination address;
    determining a transmitting device identifier value and a root device identifier value from the packet;
    determining one or more switch device addresses that correspond to the transmitting device identifier value and a root device identifier value;
    creating and storing information identifying the switch devices in a storage area that is accessible to the remote monitor agent and the network management system.

2. A machine-implemented method comprising:
    a remote monitoring agent or discovery service carried by a network device capturing a plurality of Bridge Protocol Data Unit packets with multicast destination addresses;
    discovering devices that communicate Bridge Protocol Data Unit elements, wherein the discovering is performed by at least
        determining, for each of the plurality of Bridge Protocol Data Unit packets, a transmitting device identifier and a root device identifier, wherein
            the transmitting device identifier is a MAC address,
            the root device identifier is a MAC address,
            the transmitting device identifier may be identical to, or different than, the root device identifier, and
            the devices that are discovered in the discovering step are devices associated with the transmitting device identifier and the root device identifier;
    determining IP addresses for the devices tat are discovered in the step of discovering by at least
        examining an ARP to determine whether the ARP has an entry with IP addresses corresponding to each of the MAC addresses,
        if there is no entry in the ARP for any of the MAC addresses, then the RMON agent or discovery service sends a Reverse Address Resolution Protocol (RARP) broadcast request into the network,
            wherein the RARP request includes
                the MAC address value and
                a parameter that requests the IP address, and
            wherein if a response to the RARP request is received, an IP address value received as a result of the response is associated with the MAC address;
    storing device information about the devices in an MIB table if an entry containing the device information does not exist, wherein the device information includes at least
        the MAC Address,
        the IP Address,
        a Router Interface Number on which the Bridge Protocol Data Unit was captured,
        a Router Interface Address, and
        a subnet mask;
    a Net Work Management System (NMS) discovering a network device carrying the RMON or discovery service; and
    the NMS querying the MIB table associated with the RMON or discovery service, by at least using an SNMP MIB request to retrieve information about devices that have been discovered in the network to discover the devices that are connected to a LAN that is in turn connected to the network device carrying the RMON or discovery service;
    the NMS generating a graphical display of a network topology using the information in the MIB tables, wherein the topology includes the devices;
    wherein the method is capable of determining that a particular device is an only device of a local area network that is logically coupled to the network device, by determining at least that the Root ID value and Transmitting Bridge ID value in some of the plurality of Bridge Protocol Data Units are identical;
    wherein if multiple devices are connected in a cascade, the method is capable of discovering the device corresponding to the Root ID based on the Root ID, discovering the device corresponding to the Transmitting Bridge ID from the Transmitting Bridge ID,
    and the method is capable of discovering others of the multiple devices via at least
        another RMON agent or discovery service discovering at least some of the others of the multiple devices, wherein the other RMON or discovery service is carried on another network device that is connected to a logical segment containing the multiple devices, reapplying the method after a network topology change, and reapplying the method after an occurrence of a Bridge Protocol Data Unit Keep-Alive packet delay in which detecting packets having a delay time of greater than a pre-determined period of time causes the devices to re-elect a new device as root node.

3. A method of automatically discovering network devices in a network for use by a network management system, comprising the steps of:

discovering network devices, wherein the network devices transmit one or more data packets each data packet having at least a transmitting device identifier value and a root device identifier value corresponding to one or more of the network devices, and a multicast destination address, and wherein the step of discovering includes at least the steps of receiving the one or more data packets at an entity that is remote from the network management system and that is logically coupled to the network;

determining, at the entity, the transmitting device identifier value and the root device identifier value from the data packet;

determining one or more device addresses that correspond to, but that are different from, the transmitting device identifier value and the root device identifier value, wherein the one or more device addresses correspond to the network devices discovered;

creating and storing information identifying the network devices discovered in a storage area that is accessible to the entity and the network management system.

4. A method as recited in claim 3, wherein the step of receiving the one or more data packets comprises the step of receiving one or more Bridge Protocol Data Units at the entity.

5. A method as recited in claim 3, wherein the step of receiving the one or more data packets at the entity comprises the step of receiving one or more Bridge Protocol Data Units at a remote monitor agent in a router in the network.

6. A method as recited in claim 3, wherein the step of receiving the one or more data packets comprises the step of receiving each packet that has a Spanning Tree multicast destination address and that appears on any interface of a router in the network.

7. A method as recited in claim 3, wherein the step of receiving the one or more data packets comprises the step of receiving each packet that has a Spanning Tree multicast destination address and that appears on any interface of a router in the network, wherein the router is coupled to a logical segment of the network that includes the entity.

8. A method as recited in claim 3, wherein the step of receiving the one or more data packets at the entity comprises the step of receiving one or more Bridge Protocol Data Units at a remote monitor agent; and wherein the step of determining a transmitting device identifier value and a root device identifier value comprises the step of identifying and obtaining a Transmitting Bridge ID value and a Root Device ID value from the Bridge Protocol Data Units.

9. A method as recited in claim 3, wherein the network devices are switches and the step of creating and storing information comprises the step of creating and storing a switch information table as an extension to a Management Information Base that is accessible to the entity.

10. A method as recited in claim 3, wherein the network devices are switches, the entity is a remote monitor agent, and the step of creating and storing information comprises the steps of:

creating a switch information table as an extension to a Management Information Base that is accessible to a remote monitor agent;

storing, in the switch information table, an entry for a discovered switch that includes a Switch MAC Address value and Switch IP Address value.

11. A method as recited in claim 3, wherein the network devices are switches, the entity is a remote monitor agent, and the step of creating and storing information comprises the steps of:

creating a switch information table as an extension to a Management Information Base that is accessible to the remote monitor agent;

storing, in the switch information table, an entry for a discovered switch that includes a Switch MAC Address value, Switch IP Address value, Router Interface Number value for a router interface, and Router Interface Address and Subnet Mask values for the router interface.

12. A method as recited in claim 3, further comprising the step of repeating each of the preceding steps in response to election by the network devices of a new Spanning Tree root node.

13. A method as recited in claim 3, wherein the network devices are switches, the entity is a remote monitor agent, and the step of determining one or more device addresses that correspond to, but are different from, the transmitting device identifier value and root device identifier value includes the steps of:

receiving one or more Bridge Protocol Data Units at the remote monitor agent;

identifying and obtaining a Transmitting Bridge ID value and a Root Device ID value from the Bridge Protocol Data Units;

converting the Transmitting Bridge ID value and Root Device ID value into Internet Protocol addresses of one or more forwarding switch devices.

14. A method as recited in claim 3, wherein the network devices are switches, the entity is a remote monitor agent, and the step of determining one or more device addresses that correspond to, but are different from, the transmitting device identifier value and root device identifier value includes the steps of:

receiving one or more Bridge Protocol Data Units at the remote monitor agent;

identifying and obtaining a Transmitting Bridge ID value and a Root Device ID value from the Bridge Protocol Data Units;

determining an Internet Protocol address associated with one or more forwarding switch devices by carrying out a reverse lookup of the Transmitting Bridge ID value and the Root Device ID value.

15. A method as recited in claim 3, wherein the network devices are switches, the entity is a remote monitor agent, and the step of determining one or more device addresses that correspond to, but are different from, the transmitting device identifier value and root device identifier value includes the steps of:

receiving one or more Bridge Protocol Data Units at the remote monitor agent;

identifying and obtaining a Transmitting Bridge ID value and a Root Device ID value from the Bridge Protocol Data Units; and receiving one or more Internet Protocol addresses associated with the one or more forwarding switch devices in response to issuing a Reverse Address Resolution Protocol (RARP) request to the network, wherein the RARP request includes the Transmitting Bridge ID value and Root Device ID as parameters.

16. A method as recited in claim 3, wherein the network devices are switches, the entity is a remote monitor agent, and the step of determining one or more device addresses that correspond to, but are different from, the transmitting device identifier value and a root device identifier value includes the steps of:

receiving one or more Bridge Protocol Data Units at the remote monitor agent;

identifying and obtaining a Transmitting Bridge ID value and a Root Device ID value from the Bridge Protocol Data Units;

wherein the Transmitting Bridge ID value and the Root Device ID value are MAC Addresses of one or more forwarding switch devices.

17. A method as recited in claim 3, wherein the network devices are switches, the entity is a remote monitor agent, and the step of determining one or more device addresses that correspond to, but are different from, the transmitting device identifier value and a root device identifier value includes the steps of:

receiving one or more Bridge Protocol Data Units at the remote monitor agent;

identifying and obtaining a Transmitting Bridge ID value and a Root Device ID value from the Bridge Protocol Data Units;

wherein the Transmitting Bridge ID value and Root Device ID value are MAC Addresses of one or more forwarding switch devices;

determining an Internet Protocol address associated with the one or more forwarding switch devices by carrying out a reverse lookup of the MAC Addresses in the network.

18. A method as recited in claim 3, wherein the network devices are switches, the entity is a remote monitor agent, and the step of determining one or more device addresses that correspond to, but are different from, the transmitting device identifier value and a root device identifier value includes the steps of:

receiving one or more Bridge Protocol Data Units at the remote monitor agent;

identifying and obtaining a Transmitting Bridge ID value and a Root Device ID value from the Bridge Protocol Data Units;

wherein the Transmitting Bridge ID value and Root Device ID value are MAC Addresses of one or more forwarding switch devices; and receiving one or more Internet Protocol addresses associated with the one or more forwarding switch devices in response to issuing a Reverse Address Resolution Protocol (RARP) request to the network, wherein the RARP request includes the Transmitting Bridge ID value and Root Device ID as parameters.

19. A method as recited in claim 3, wherein the method further comprises determining that a particular network device is an only network device of a local area network that is logically coupled to the entity, by determining at least that the Root ID value and Transmitting Bridge ID value are identical in at least one of the data packets received.

20. A method as recited in claim 3, further comprising:

discovering one or more of the network devices from an initial application of the method;

discovering one or more additional network devices by reapplying the method after a network topology change, wherein the additional network devices were not found during the initial application;

including in topology information the one or more network devices and the one or more additional network devices.

21. A method as recited claim 3, further comprising:

discovering one or more network devices from an initial application of the method;

discovering one or more additional network devices by reapplying the method after an occurrence of a Bridge Protocol Data Unit Keep-Alive packet delay in which detecting packets having a delay time of greater than a pre-determined period of time causes the devices to re-elect a new device as root node, wherein the one or more additional network devices were not discovered during the initial application of the method;

including in topology information the one or more network devices and the one or more additional network devices.

22. A method as recited in claim 3, wherein at least one of the network devices discovered is not a switch.

23. A method as recited in claim 3, wherein the data packets are Bridge Protocol Data Units and the method is capable of discovering any type of network device that transmits Bridge Protocol Data Units and is associated with a MAC address and an IP address.

24. A method as recited in claim 3, further comprising:

the network management system accessing the storage area for the information; and the network management system presenting the information as topology information about a topology of the network.

25. A method as recited in claim 3, further comprising:

the network management system gathering the information identifying the network devices from a plurality of entities and forming topology information about the network.

26. A method of automatically discovering switch devices in a network for use by a network management system, comprising the steps of:

receiving one or more data packets at a remote monitor agent that is logically coupled to the network, each packet containing a multicast destination address;

determining a transmitting device identifier value from the packet and a root device identifier value only from a corresponding field in the packet;

determining one or more switch device addresses that correspond to the transmitting device identifier value and root device identifier value;

creating and storing information identifying the switch devices in a storage area that is accessible to the remote monitor agent and the network management system.

27. A computer-readable medium carrying one or more sequences of instructions for providing automatic discovery of switch devices in a network, wherein execution of the one or more sequences of instructions by one or more processors causes the one or more processors to perform a method comprising the steps of:

discovering network devices, wherein the network devices transmit one or more data packets each data packet having at least a transmitting device identifier value and a root device identifier value corresponding to one or more of the network devices, and a multicast destination address, and wherein the step of discovering includes at least the steps of receiving the one or more data packets at an entity that is remote from the network management system and that is logically coupled to the network;

determining, at the entity, the transmitting device identifier value and the root device identifier value from the data packet;

determining one or more device addresses that correspond to, but that are different from, the transmitting device identifier value and the root device identifier value, wherein the one or more device addresses correspond to the network devices discovered;

creating and storing information identifying the network devices discovered in a storage area that is accessible to the entity and the network management system.

28. A computer readable medium as recited in claim 27, wherein the method further comprises determining that a particular network device is an only network device of a local area network that is logically coupled to the entity, by determining at least that the Root ID value and Transmitting Bridge ID value are identical in at least one of the data packets received.

29. A computer readable medium as recited in claim 27, wherein the method further comprises:

discovering one or more of the network devices from an initial application of the method;

discovering one or more additional network devices by reapplying the method after a network topology change, wherein the additional network devices were not found during the initial application;

including in topology information the one or more network devices and the one or more additional network devices.

30. A computer readable medium as recited in claim 27, wherein the method further comprises:

discovering one or more network devices from an initial application of the method;

discovering one or more additional network devices by reapplying the method after an occurrence of a Bridge Protocol Data Unit Keep-Alive packet delay in which detecting packets having a delay time of greater than a pre-determined period of time causes the devices to re-elect a new device as root node, wherein the one or more additional network devices were not discovered during the initial application of the method;

including in topology information the one or more network devices and the one or more additional network devices.

31. A computer readable medium as recited in claim 27, wherein at least one of the network devices discovered is not a switch.

32. A computer readable medium as recited in claim 27, wherein the data packets are Bridge Protocol Data Units and the method is capable of discovering any type of network device that transmits Bridge Protocol Data Units and is associated with a MAC address and an IP address.

33. A computer readable medium as recited in claim 27, wherein the method further comprises:

the network management system accessing the storage area for the information; and the network management system presenting the information as topology information about a topology of the network.

34. A computer readable medium as recited in claim 27, wherein the method further comprises:

the network management system gathering the information identifying the network devices from a plurality of entities and forming topology information about the network.

35. A computer readable medium as recited in claim 27, wherein the step of receiving the one or more data packets comprises the step of receiving one or more Bridge Protocol Data Units at the entity.

36. A computer readable medium as recited in claim 27, wherein the step of receiving the one or more data packets at the entity comprises the step of receiving one or more Bridge Protocol Data Units at a remote monitor agent in a router in the network.

37. A computer readable medium as recited in claim 27, wherein the step of receiving the one or more data packets comprises the step of receiving each packet that has a Spanning Tree multicast destination address and that appears on any interface of a router in the network.

38. A computer readable medium as recited in claim 27, wherein the step of receiving the one or more data packets comprises the step of receiving each packet that has a Spanning Tree multicast destination address and that appears on any interface of a router in the network, wherein the router is coupled to a logical segment of the network that includes the entity.

39. A computer readable medium as recited in claim 27, wherein the step of receiving the one or more data packets at the entity comprises the step of receiving one or more Bridge Protocol Data Units at a remote monitor agent; and wherein the step of determining a transmitting device identifier value and a root device identifier value comprises the step of identifying and obtaining a Transmitting Bridge ID value and a Root Device ID value from the Bridge Protocol Data Units.

40. A computer readable medium as recited in claim 27, wherein the network devices are switches and the step of creating and storing information comprises the step of creating and storing a switch information table as an extension to a Management Information Base that is accessible to the entity.

41. A computer readable medium as recited in claim 27, wherein the network devices are switches, the entity is a remote monitor agent, and the step of creating and storing information comprises the steps of:

creating a switch information table as an extension to a Management Information Base that is accessible to a remote monitor agent;

storing, in the switch information table, an entry for a discovered switch that includes a Switch MAC Address value and Switch IP Address value.

42. A computer readable medium as recited in claim 27, wherein the network devices are switches, the entity is a remote monitor agent, and the step of creating and storing information comprises the steps of:

creating a switch information table as an extension to a Management Information Base that is accessible to the remote monitor agent;

storing, in the switch information table, an entry for a discovered switch that includes a Switch MAC Address value, Switch IP Address value, Router Interface Number value for a router interface, and Router Interface Address and Subnet Mask values for the router interface.

43. A computer readable medium as recited in claim 27, further comprising the step of repeating each of the preceding steps in response to election by the network devices of a new Spanning Tree root node.

44. A computer readable medium as recited in claim 27, wherein the network devices are switches, the entity is a remote monitor agent, and the step of determining one or more device addresses that correspond to, but are different from, the transmitting device identifier value and root device identifier value includes the steps of:
receiving one or more Bridge Protocol Data Units at the remote monitor agent;
identifying and obtaining a Transmitting Bridge ID value and a Root Device ID value from the Bridge Protocol Data Units;
converting the Transmitting Bridge ID value and Root Device ID value into Internet Protocol addresses of one or more forwarding switch devices.

45. A computer readable medium as recited in claim 27, wherein the network devices are switches, the entity is a remote monitor agent, and the step of determining one or more device addresses that correspond to, but are different from, the transmitting device identifier value and root device identifier value includes the steps of:
receiving one or more Bridge Protocol Data Units at the remote monitor agent;
identifying and obtaining a Transmitting Bridge ID value and a Root Device ID value from the Bridge Protocol Data Units;
determining an Internet Protocol address associated with one or more forwarding switch devices by carrying out a reverse lookup of the Transmitting Bridge ID value and the Root Device ID value.

46. A computer readable medium as recited in claim 27, wherein the network devices are switches, the entity is a remote monitor agent, and the step of determining one or more device addresses that correspond to, but are different from, the transmitting device identifier value and root device identifier value includes the steps of:
receiving one or more Bridge Protocol Data Units at the remote monitor agent;
identifying and obtaining a Transmitting Bridge ID value and a Root Device ID value from the Bridge Protocol Data Units; and
receiving one or more Internet Protocol addresses associated with the one or more forwarding switch devices in response to issuing a Reverse Address Resolution Protocol (RARP) request to the network, wherein the RARP request includes the Transmitting Bridge ID value and Root Device ID as parameters.

47. A computer readable medium as recited in claim 27, wherein the network devices are switches, the entity is a remote monitor agent, and the step of determining one or more device addresses that correspond to, but are different from, the transmitting device identifier value and a root device identifier value includes the steps of:
receiving one or more Bridge Protocol Data Units at the remote monitor agent;
identifying and obtaining a Transmitting Bridge ID value and a Root Device ID value from the Bridge Protocol Data Units;
wherein the Transmitting Bridge ID value and the Root Device ID value are MAC Addresses of one or more forwarding switch devices.

48. A computer readable medium as recited in claim 27, wherein the network devices are switches, the entity is a remote monitor agent, and the step of determining one or more device addresses that correspond to, but are different from, the transmitting device identifier value and a root device identifier value includes the steps of:
receiving one or more Bridge Protocol Data Units at the remote monitor agent;
identifying and obtaining a Transmitting Bridge ID value and a Root Device ID value from the Bridge Protocol Data Units;
wherein the Transmitting Bridge ID value and Root Device ID value are MAC Addresses of one or more forwarding switch devices;
determining an Internet Protocol address associated wit the one or more forwarding switch devices by carrying out a reverse lookup of the MAC Addresses in the network.

49. A computer readable medium as recited in claim 27, wherein the network devices are switches, the entity is a remote monitor agent, and the step of determining one or more device addresses that correspond to, but are different from, the transmitting device identifier value and a root device identifier value includes the steps of:
receiving one or more Bridge Protocol Data Units at the remote monitor agent;
identifying and obtaining a Transmitting Bridge ID value and a Root Device ID value from the Bridge Protocol Data Units;
wherein the Transmitting Bridge ID value and Root Device ID value are MAC Addresses of one or more forwarding switch devices; and
receiving one or more Internet Protocol addresses associated with the one or more forwarding switch devices in response to issuing a Reverse Address Resolution Protocol (RARP) request to the network, wherein the RARP request includes the Transmitting Bridge ID value and Root Device ID as parameters.

50. A computer-readable medium carrying one or more sequences of instructions for providing automatic discovery of switch devices in a network, wherein execution of the one or more sequences of instructions by one or more processors causes the one or more processors to perform a method comprising the steps of:
receiving one or more data packets at a remote monitor agent that is logically coupled to the network, each packet containing a multicast destination address;
determining a transmitting device identifier value from the packet and a root device identifier value only from a corresponding field in the packet;
determining one or more switch device addresses that correspond to the transmitting device identifier value and root device identifier value;
creating and storing information identifying the switch devices in a storage area that is accessible to the remote monitor agent and the network management system.

51. An apparatus for automatically discovering network devices in a network, comprising:
a processor;
one or more stored sequences of instructions which, when executed by the processor, cause the processor to carry out a method including at least the steps of:

discovering network devices, wherein the network devices transmit one or more data packets each data packet having at least a transmitting device identifier value and a root device identifier value corresponding to one or more of the network devices, and a multicast destination address, and wherein the step of discovering includes at least the steps of receiving the one or more data packets at an entity that is remote from the network management system and that is logically coupled to the network;

determining, at the entity, the transmitting device identifier value and the root device identifier value from the data packet;

determining one or more device addresses that correspond to, but that are different from, the transmitting device identifier value and the root device identifier value, wherein the one or more device addresses correspond to the network devices discovered;

creating and storing information identifying the network devices discovered in a storage area that is accessible to the entity and the network management system.

52. An apparatus as recited in claim 51, wherein the method further comprises determining that a particular network device is an only network device of a local area network that is logically coupled to the entity, by determining at least that the Root ID value and Transmitting Bridge I value are identical in at least one of the data packets received.

53. An apparatus as recited in claim 51, wherein the method farther comprises:

discovering one or more of the network devices from an initial application of the method;

discovering one or more additional network devices by reapplying the method after a network topology change, wherein the additional network devices were not found during the initial application;

including in topology information the one or more network devices and the one or more additional network devices.

54. An apparatus as recited in claim 51, wherein the method further comprises:

discovering one or more network devices from an initial application of the method;

discovering one or more additional network devices by reapplying the method after an occurrence of a Bridge Protocol Data Unit Keep-Alive packet delay in which detecting packets having a delay time of greater than a pre-determined period of time causes the devices to re-elect a new device as root node, wherein the one or more additional network devices were not discovered during the initial application of the method;

including in topology information the one or more network devices and the one or more additional network devices.

55. An apparatus as recited in claim 51, wherein at least one of the network devices discovered is not a switch.

56. An apparatus as recited in claim 51, wherein the data packets are Bridge Protocol Data Units and the method is capable of discovering any type of network device that transmits Bridge Protocol Data Units and is associated with a MAC address and an IP address.

57. An apparatus as recited in claim 51, wherein the method further comprises:

the network management system accessing the storage area for the information; and the network management system presenting the information as topology information about a topology of the network.

58. An apparatus as recited in clam 51, wherein the-method further comprises:

the network management system gathering the information identifying the network devices from a plurality of entities and forming topology information about the network.

59. An apparatus as recited in claim 51, wherein the step of receiving the one or more data packets comprises the step of receiving one or more Bridge Protocol Data Units at the entity.

60. An apparatus as recited in claim 51, wherein the step of receiving the one or more data packets at the entity comprises the step of receiving one or more Bridge Protocol Data Units at a remote monitor agent in a router in the network.

61. An apparatus as recited in claim 51, wherein the step of receiving the one or more data packets comprises the step of receiving each packet that has a Spanning Tree multicast destination address and that appears on any interface of a router in the network.

62. An apparatus as recited in claim 51, wherein the step of receiving the one or more data packets comprises the step of receiving each packet that has a Spanning Tree multicast destination address and that appears on any interface of a router in the network, wherein the router is coupled to a logical segment of the network that includes the entity.

63. An apparatus as recited in claim 51, wherein the step of receiving the one or more data packets at the entity comprises the step of receiving one or more Bridge Protocol Data Units at a remote monitor agent; and wherein the step of determining a transmitting device identifier value and a root device identifier value comprises the step of identifying and obtaining a Transmitting Bridge ID value and a Root Device ID value from the Bridge Protocol Data Units.

64. An apparatus as recited in claim 51, wherein the network devices are switches and the step of creating and storing information comprises the step of creating and storing a switch information table as an extension to a Management Information Base that is accessible to the entity.

65. An apparatus as recited in claim 51, wherein the network devices are switches, the entity is a remote monitor agent, and the step of creating and storing information comprises the steps of:

creating a switch information table as an extension to a Management Information Base that is accessible to a remote monitor agent;

storing, in the switch information table, an entry for a discovered switch that includes a Switch MAC Address value and Switch IP Address value.

66. An apparatus as recited in claim 51, wherein the network devices are switches, the entity is a remote monitor agent, and the step of creating and storing information comprises the steps of:

creating a switch information table as an extension to a Management Information Base that is accessible to the remote monitor agent;

storing, in the switch information table, an entry for a discovered switch that includes a Switch MAC Address value, Switch IP Address value, Router Interface Number value for a router interface, and Router Interface Address and Subnet Mask values for the router interface.

67. An apparatus as recited in claim 51, wherein the method further comprises the step of repeating each of the preceding steps in response to election by the network devices of a new Spanning Tree root node.

68. An apparatus as recited in claim 51, wherein the network devices are switches, the entity is a remote monitor agent, and the step of determining one or more device addresses that correspond to, but are different from, the transmitting device identifier value and root device identifier value includes the steps of:
- receiving one or more Bridge Protocol Data Units at the remote monitor agent;
- identifying and obtaining a Transmitting Bridge ID value and a Root Device ID value from the Bridge Protocol Data Units;
- converting the Transmitting Bridge ID value and Root Device ID value into Internet Protocol addresses of one or more forwarding switch devices.

69. An apparatus as recited in claim 51, wherein the network devices are switches, the entity is a remote monitor agent, and the step of determining one or more device addresses that correspond to, but are different from, the transmitting device identifier value and root device identifier value includes the steps of:
- receiving one or more Bridge Protocol Data Units at the remote monitor agent;
- identifying and obtaining a Transmitting Bridge ID value and a Root Device ID value from the Bridge Protocol Data Units;
- determining an Internet Protocol address associated with one or more forwarding switch devices by carrying out a reverse lookup of the Transmitting Bridge ID value and the Root Device ID value.

70. An apparatus as recited in claim 51, wherein the network devices are switches, the entity is a remote monitor agent, and the step of determining one or more device addresses that correspond to, but are different from, the transmitting device identifier value and root device identifier value includes the steps of:
- receiving one or more Bridge Protocol Data Units at the remote monitor agent;
- identifying and obtaining a Transmitting Bridge ID value and a Root Device ID value from the Bridge Protocol Data Units; and
- receiving one or more Internet Protocol addresses associated with the one or more forwarding switch devices in response to issuing a Reverse Address Resolution Protocol (RARP) request to the network, wherein the RARP request includes the Transmitting Bridge ID value and Root Device ID as parameters.

71. An apparatus as recited in claim 51, wherein the network devices are switches, the entity is a remote monitor agent, and the step of determining one or more device addresses that correspond to, but are different from, the transmitting device identifier value and a root device identifier value includes the steps of:
- receiving one or more Bridge Protocol Data Units at the remote monitor agent;
- identifying and obtaining a Transmitting Bridge ID value and a Root Device ID value from the Bridge Protocol Data Units;
- wherein the Transmitting Bridge ID value and the Root Device ID value are MAC Addresses of one or more forwarding switch devices.

72. An apparatus as recited in claim 51, wherein the network devices are switches, the entity is a remote monitor agent, and the step of determining one or more device addresses that correspond to, but are different from, the transmitting device identifier value and a root device identifier value includes the steps of:
- receiving one or more Bridge Protocol Data Units at the remote monitor agent;
- identifying and obtaining a Transmitting Bridge ID value and a Root Device ID value from the Bridge Protocol Data Units;
- wherein the Transmitting Bridge ID value and Root Device ID value are MAC Addresses of one or more forwarding switch devices;
- determining an Internet Protocol address associated with the one or more forwarding switch devices by carrying out a reverse lookup of the MAC Addresses in the network.

73. An apparatus as recited in claim 51, wherein the network devices are switches, the entity is a remote monitor agent, and the step of determining one or more device addresses that correspond to, but are different from, the transmitting device identifier value and a root device identifier value includes the steps of:
- receiving one or more Bridge Protocol Data Units at the remote monitor agent;
- identifying and obtaining a Transmitting Bridge ID value and a Root Device ID value from the Bridge Protocol Data Units;
- wherein the Transmitting Bridge ID value and Root Device ID value are MAC Addresses of one or more forwarding switch devices; and
- receiving one or more Internet Protocol addresses associated with the one or more forwarding switch devices in response to issuing a Reverse Address Resolution Protocol (RARP) request to the network, wherein the RARP request includes the Transmitting Bridge ID value and Root Device ID as parameters.

74. An apparatus for automatically discovering network devices in a network, comprising:
- a processor;
- one or more stored sequences of instructions which, when executed by the processor, cause the processor to carry out a method including at least the steps of:
  - receiving one or more data packets at a remote monitor agent that is logically coupled to the network, each packet containing a multicast destination address;
  - determining a transmitting device identifier value from the packet and a root device identifier value only from a corresponding field in the packet;
  - determining one or more switch device addresses that correspond to the transmitting device identifier value and root device identifier value;
  - creating and storing information identifying the switch devices in a storage area that is accessible to the remote monitor agent and the network management system.

* * * * *

UNITED STATES PATENT AND TRADEMARK OFFICE
CERTIFICATE OF CORRECTION

PATENT NO. : 6,795,403 B1
DATED : September 21, 2004
INVENTOR(S) : Srinath Gundavelli It is certified that error appears in the above-identified patent and that said Letters Patent is hereby corrected as shown below:

Column 19,
Line 31, "farther" should read -- further --.

Signed and Sealed this

Eighteenth Day of January, 2005

JON W. DUDAS
*Director of the United States Patent and Trademark Office*